(12) United States Patent
Lin et al.

(10) Patent No.: US 8,581,550 B2
(45) Date of Patent: Nov. 12, 2013

(54) METHOD AND APPARATUS FOR IDENTIFYING TYPES OF ENERGY SOURCES USED TO CHARGE A BATTERY

(75) Inventors: Michael Lin, San Francisco, CA (US); Mitchell Heinrich, San Francisco, CA (US); Jonas Ketterle, Palo Alto, CA (US); Brian Warshawsky, San Francisco, CA (US); Paul Jehlen, San Francisco, CA (US); Jonathan Thomas, San Francisco, CA (US); John Pelochino, Redwood City, CA (US); Akbar Dhanaliwala, San Francisco, CA (US); Brian Krieger, San Francisco, CA (US)

(73) Assignee: Fenix International, Inc., San Francisco, CA (US)

(*) Notice: Subject to any disclaimer, the term of this patent is extended or adjusted under 35 U.S.C. 154(b) by 470 days.

(21) Appl. No.: 12/879,131

(22) Filed: Sep. 10, 2010

(65) Prior Publication Data

US 2011/0062913 A1  Mar. 17, 2011

Related U.S. Application Data

(60) Provisional application No. 61/276,418, filed on Sep. 12, 2009.

(51) Int. Cl.
*H02J 7/14* (2006.01)
(52) U.S. Cl.
USPC ............................................ 320/123; 702/64
(58) Field of Classification Search
USPC ............... 320/101, 123, 138; 307/52, 56, 72; 290/50; 702/57, 64, 65, 66, 71, 73, 79
See application file for complete search history.

(56) References Cited

U.S. PATENT DOCUMENTS

| 4,160,941 | A | | 7/1979 | Bennett | |
|---|---|---|---|---|---|
| 5,225,712 | A | | 7/1993 | Erdman | |
| 5,254,929 | A | | 10/1993 | Yang | |
| 5,420,496 | A | * | 5/1995 | Ishikawa | 320/106 |
| 5,506,490 | A | * | 4/1996 | DeMuro | 320/106 |
| 5,640,076 | A | * | 6/1997 | Youn | 320/138 |
| 6,462,507 | B2 | | 10/2002 | Fisher, Jr. | |
| 6,555,930 | B1 | * | 4/2003 | Kohl et al. | 290/40 C |
| 6,917,184 | B2 | * | 7/2005 | Lai et al. | 320/125 |
| 6,943,459 | B2 | | 9/2005 | Hartman et al. | |

(Continued)

FOREIGN PATENT DOCUMENTS

WO  WO 2009009176 A2 *  1/2009

OTHER PUBLICATIONS

International Search Report & Written Opinion, Application No. PCT/US2010/048372, Applicant, Fenix International, Inc., Mailed, May 18, 2011, 10 pages.

(Continued)

*Primary Examiner* — Yalkew Fantu
*Assistant Examiner* — Manuel Hernandez
(74) *Attorney, Agent, or Firm* — Marjama Muldoon Blasiak & Sullivan LLP

(57) ABSTRACT

A method and apparatus for identifying different types of energy sources used to charge a battery by receiving energy from at least one of the different types of energy sources at input terminals, identifying the type of energy source, and selecting a mode for charging the battery based on the type of energy source identified. A method and apparatus for protecting against certain energy sources used to charge a battery is also disclosed.

19 Claims, 12 Drawing Sheets

(56) References Cited

U.S. PATENT DOCUMENTS

| | | |
|---|---|---|
| 6,963,186 B2 | 11/2005 | Hobbs |
| 7,095,213 B2 | 8/2006 | Weng |
| 7,411,371 B2 | 8/2008 | Hobbs |
| 7,449,798 B2 | 11/2008 | Suzuki et al. |
| 7,450,406 B2 | 11/2008 | Glauser |
| 7,570,011 B2 | 8/2009 | Waikar et al. |
| 7,737,571 B2 | 6/2010 | Fein et al. |
| 2001/0043050 A1 | 11/2001 | Fisher |
| 2003/0007369 A1 | 1/2003 | Gilbreth et al. |
| 2003/0057919 A1 | 3/2003 | Yang |
| 2004/0066094 A1 | 4/2004 | Suzuki et al. |
| 2005/0161079 A1 | 7/2005 | Gray |
| 2006/0137348 A1 | 6/2006 | Pas |
| 2006/0250112 A1 | 11/2006 | Waikar et al. |
| 2008/0122518 A1 | 5/2008 | Besser et al. |
| 2008/0196758 A1 | 8/2008 | McGuire |
| 2008/0217998 A1 | 9/2008 | Parmley |
| 2008/0231119 A1 | 9/2008 | Yeh |
| 2008/0258470 A1 | 10/2008 | Khoo et al. |
| 2008/0303352 A1* | 12/2008 | Hsieh et al. .................. 307/113 |
| 2009/0076661 A1 | 3/2009 | Pearson et al. |
| 2009/0085404 A1 | 4/2009 | Suzuki et al. |
| 2009/0184687 A1* | 7/2009 | Schroeder et al. ............ 320/162 |
| 2009/0277699 A1 | 11/2009 | Wan |
| 2010/0076615 A1 | 3/2010 | Daniel et al. |
| 2010/0090605 A1 | 4/2010 | Nevins |
| 2010/0170293 A1 | 7/2010 | Tsarev et al. |
| 2010/0198421 A1 | 8/2010 | Fahimi et al. |

\* cited by examiner

METHOD AND APPARATUS FOR IDENTIFYING TYPES OF ENERGY SOURCES USED TO CHARGE A BATTERY

CROSS-REFERENCE TO RELATED APPLICATIONS

This application claims priority to U.S. Provisional Patent Application No. 61/276,418, filed on Sep. 12, 2009, entitled DECENTRALIZED ELECTRICITY GENERATION, STORAGE AND DISTRIBUTION DEVICES, which is incorporated herein by reference.

BACKGROUND OF THE INVENTION

The subject matter disclosed herein relates to a method and apparatus for conversion of energy to electricity from a plurality of different sources for immediate use, storage of electricity for later use (e.g., charging a battery), and distribution of safe, regulated electricity for end-use to provide energy services.

Many of the devices used to conduct day-to-day activities (e.g., devices providing lighting, communication, entertainment, news, medicine, etc.) require electricity to either power the devices directly or to charge the batteries used to power those devices. It is estimated that nearly one in four people on the planet (more than 1.6 billion people) lack access to electricity, many of whom live in the developing world at the base of the economic pyramid. It is also estimated that an additional billion people struggle with unreliable access to electricity. While these populations have access to electricity, the power plants and distribution grid are overloaded, undermaintained and therefore unreliable, resulting in power outages, often several outages each day, many spanning several hours or even days. As a result, this negatively impacts the economy, the ability for these populations to rise up the economic pyramid and the ability to improve quality of life.

The framework of traditional centralized power generation and grid distribution is not meeting the needs of these people because large power plant installations are costly and prone to delays and the grid improvements required to distribute this electricity is expensive as well. Even alternatives such as petrol-powered generators (e.g., diesel or gasoline) and the current offering of solar photovoltaic home systems experience only limited success because of cost (e.g., high operating cost purchasing fossil fuel, or high upfront cost to purchase solar home systems) and reliability issues (e.g., inexpensive generators often experience malfunctions and the current offering of solar home systems require installation, maintenance and support).

And yet, despite these challenges, it is estimated that there are presently over 500 million off-grid mobile phone subscribers and countless other off-grid appliances (e.g., lights, radios, televisions, refrigerators, etc.). To power these appliances, millions of people at the base of the pyramid have re-appropriated 12V direct current (DC) lead-acid car batteries to serve the need of energy storage and electricity distribution. However, the practice of using jumper cables or twisting bare wires to connect appliances leaves much to be desired where such usage of unprotected batteries is dangerous, significantly reduces battery life, and frequently causes sparks and even electrocution.

Populations in areas that do have access to reliable sources of electricity under normal circumstances may be subject to natural disasters, blackouts, or planned recreational activities to remote locations (e.g., camping or hiking) that result in prolonged periods of time where users do not have access to electricity to operate or charge their appliances. Some users that do have access to a modern power distribution grid, for environmental reasons, may choose to use renewable energy sources when possible (e.g., solar power, kinetic power, etc.). In some cases, users may employ kinetic generators operated by rotating and driving a shaft with a device driven by natural forces (e.g., wind turbine, hydro turbine, etc.) or by human/animal forces (e.g., bicycle generator, hand-crank, animal generator, etc.) to create the required electricity. Often times, however, these systems do not supply sufficient power to supply the electricity necessary for powering or charging devices for prolonged periods of time without requiring excessive amounts of effort by the users or performance by the devices. In addition, many these systems can only accept one type of energy source and may be damaged if another source were inadvertently connected.

It would be advantageous to provide a method and apparatus for supplying electrical power for people who do not have access to reliable electricity to improve the quality of life for these individuals, provide a safer and more effective source of electrical power, and provide the flexibility to use a plurality of different types of energy sources, including renewable energy sources.

BRIEF DESCRIPTION OF THE INVENTION

In one embodiment of the invention, a method and apparatus are disclosed for identifying different types of energy sources used to charge a battery by receiving energy from at least one of the different types of energy sources at input terminals, identifying the type of energy source, and selecting a mode for charging the battery based on the type of energy source identified.

In another embodiment of the invention, a method and apparatus are disclosed for protecting against certain energy sources used to charge a battery by determining the voltage at input terminals isolated from the battery by a switch, continuously determining if the voltage of the energy source at the input terminals is less than a maximum source voltage threshold and greater than a minimum source voltage threshold, opening the switch to disconnect the energy source from the battery and resetting a counter to zero if these conditions are not met, incrementing the counter if the voltage of the energy source at the input terminals is greater than a minimum source voltage threshold, closing the switch to connect the energy source to the battery if the counter has exceeded a counting threshold, confirming that the energy source is not an alternating current (AC) source, and continuously determining if the voltage of the energy source at the input terminals is greater than a minimum source voltage threshold.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of invention. Thus, for further understanding of the invention, reference can be made to the following detailed description, read in connection with the drawings in which.

DETAILED DESCRIPTION OF THE INVENTION

Figure 1:
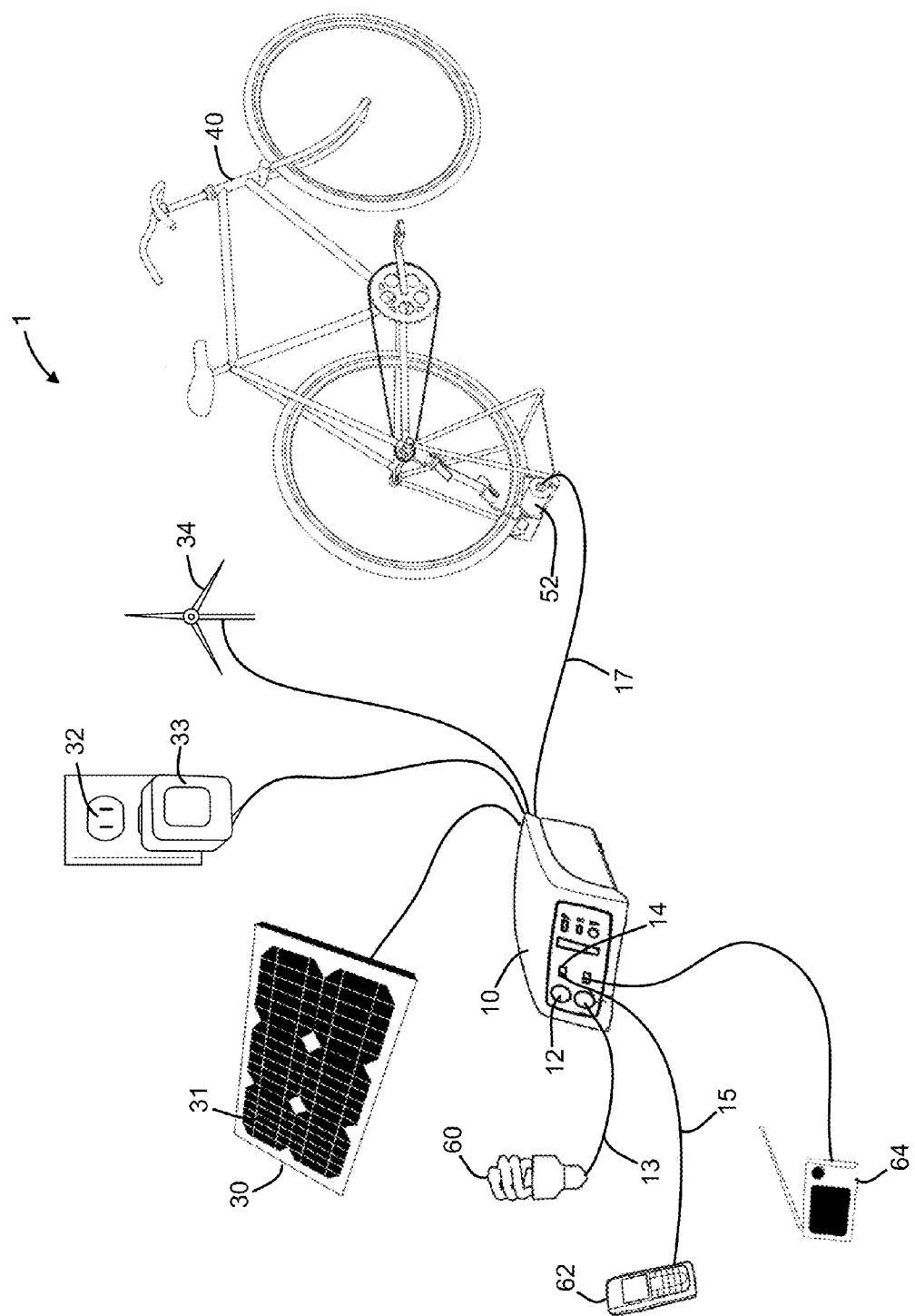
FIG. 1 illustrates an electrical power system in an exemplary embodiment of the invention.
Figure 2:
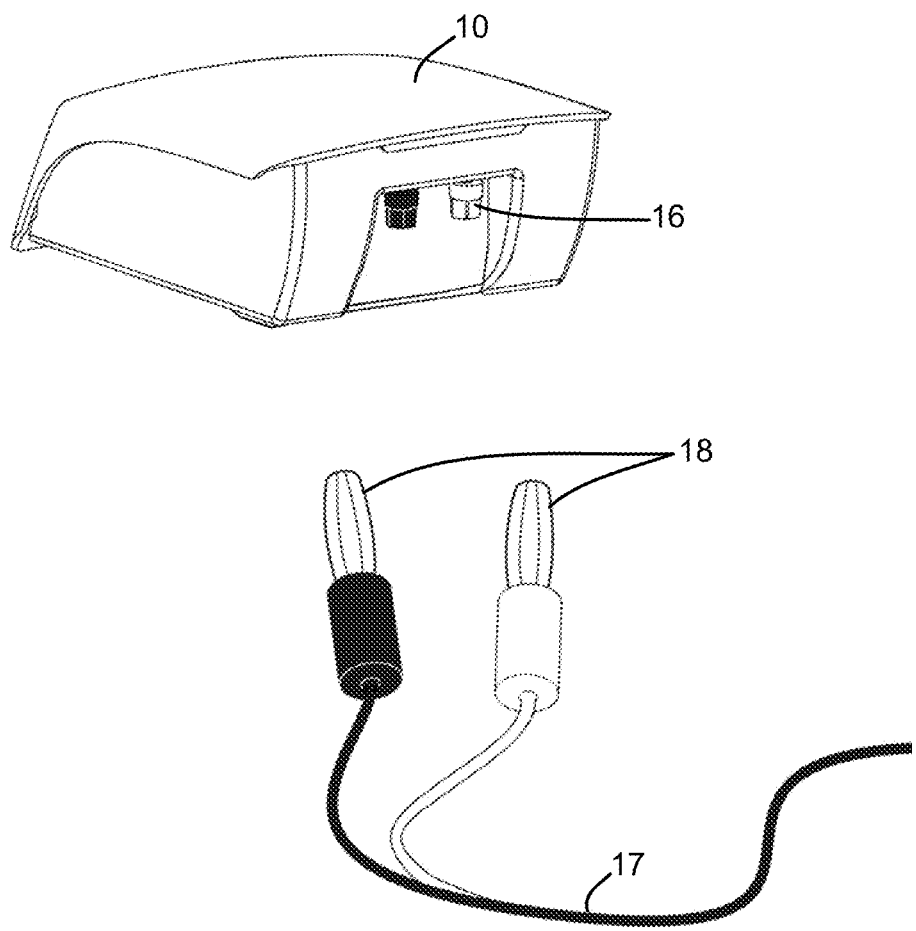
FIG. 2 illustrates an input cable connection to the power center in an exemplary embodiment of the invention.

FIG. 1 illustrates an electrical power system 1 in an exemplary embodiment of the invention. The electrical power system 1 can include a plurality of different types of energy sources (e.g., a solar panel 30 providing solar power from solar cells 31, a wall outlet adapter 33 (e.g., wall wart or power brick) providing grid power from a wall outlet 32, a bicycle generator 52 providing human-generated power from riding a bicycle 40, a wind turbine 34 providing wind-generated power, a hydro turbine (not shown) providing hydro-generated power, attachments to animals (not shown) providing animal-generated power, etc.). The plurality of different energy sources can be connected to a power center 10 using input cables 17. In one embodiment, only one of the plurality of different energy sources can be connected to the power center 10 at a time, while in another embodiment, multiple energy sources can be connected to the power center 10 at the same time. FIG. 2 illustrates an input cable 17 connection to the power center 10 in an exemplary embodiment of the invention in which the input cable 17 is terminated with input cable plugs 18 (e.g., banana plugs) that are inserted into the input terminals 16 (e.g., banana jacks or binding posts) at the rear of the power center 10. In another embodiment, bare wires can be attached to the screw terminals located on the input terminals 16, providing further flexibility for connecting a plurality of different energy sources.

The power center 10 can also have a plurality of outputs, including one or more 12V DC cigarette lighter outputs 12 (also known as cigar lighter adapters), one or more 5V DC USB outputs 14, and one or more AC outputs (e.g., 90-260V, types A-L, etc) (not shown). The cigarette lighter outputs 12 can be used to power a plurality of devices (e.g., a light 60, water purifier (not shown), refrigerator (not shown)) using a cigarette lighter output cable 13, while the USB outputs 14 can be used to power a plurality of other devices (e.g., mobile telephone 62, radio 64, LCD television (not shown)) using a USB output cable 15. In one embodiment, the light 60 can be a fluorescent or incandescent bulb. In other embodiments, the light 60 can be one or more LEDs or other alternative light sources. Use of AC outputs (not shown) would require a DC to AC converter to provide AC power from a DC battery.

Figure 3:
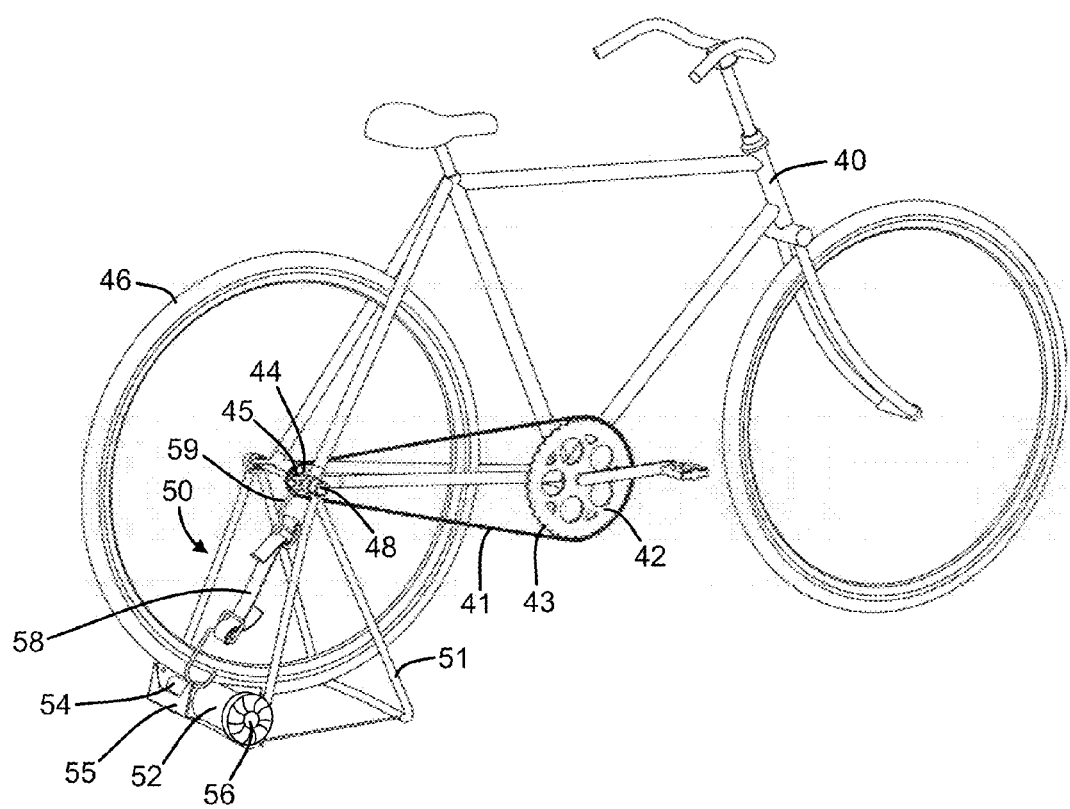
FIG. 3 illustrates a bicycle mounted on a bicycle generator adapter in an exemplary embodiment of the invention.
Figure 4:
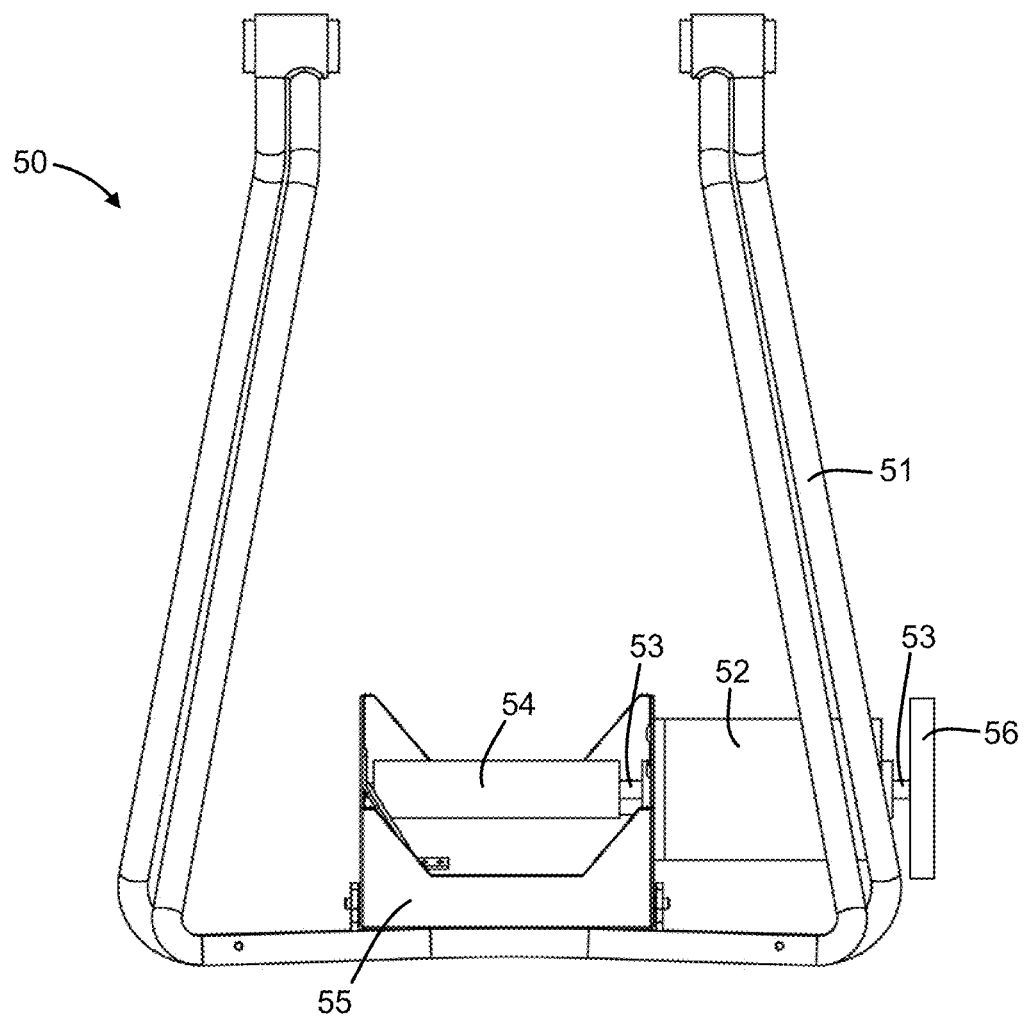
FIG. 4 illustrates a bicycle generator adapter (without the bicycle) in an exemplary embodiment of the invention.

FIG. 3 illustrates a bicycle 40 mounted on a bicycle generator adapter 50 in an exemplary embodiment of the invention. FIG. 4 illustrates a bicycle generator adapter 50 (without the bicycle 40) in an exemplary embodiment of the invention. The bicycle 40 has a front gear 42 with a certain number of front gear teeth ($GT_F$) 43 connected via a chain 41 to drive a rear gear 44 with a certain number of rear gear teeth ($GT_R$) 45. The outer tread of the rear tire 46 comes into contact with the roller 54 of bicycle generator adapter 50 and causes the roller 54 to rotate along with the rear tire 46 during cycling. The roller 54 can be mounted to the stand 51 of the bicycle generator adaptor 50 using a roller mount 55 that can rotate or pivot to allow the roller 54 to contact rear tires 46 of different dimensions. The roller mount 55 and all components mounted to the stand 51 of the bicycle adapter 50 using the roller mount 55 are firmly attached to the stand 51, but can also be removed from the stand 51 when the bicycle generator 52 is not in use. The stand 51 can also be folded when not in use.

The roller mount 55 can be attached to the rear wheel axle 48 of the rear wheel 46 using a tensioning mechanism 58 including hooks 59 attached to the roller mount 55 on one end and attached to the rear wheel axle 48 on the other end to keep the roller 54 in contact with the rear tire 46 during cycling to help avoid slippage between the rear tire 46 and the roller 54. The tensioning mechanism 58 can be made of various materials (e.g., elastic, bungee cord, non-stretchable cord (e.g., nylon), inner tube rubber).

The roller 54 is connected to a shaft 53 that drives the bicycle generator 52. In one embodiment, the shaft 53 can extend beyond the bicycle generator 52 and support a fan 56 that can rotate along with the shaft 53 providing air cooling of the bicycle generator 52, improving the capacity and performance of the device. The bicycle generator 52 can be a 36V brushed DC motor. Other voltage motors (e.g., 24V) and types of motors (e.g., brushless DC motors) can also be used in other embodiments. The power output of the bicycle generator 52 can be increased or decreased based on the speed of rotation (RPM) of the shaft 53 (e.g., the faster the rotation, the more power is generated). In one embodiment, the speed of rotation of the shaft ($S_{RPM}$) can be determined by the cadence ($C_{RAM}$) of the cyclist, gear ratio ($R_G$) (i.e., the ratio of the number of front gear teeth ($GT_F$) 43 to the number of rear gear teeth ($GT_R$) 45), and the rear tire/roller ratio ($R_{TR}$) (i.e., ratio of the diameter of the rear tire ($D_T$) to the diameter of the roller ($D_R$)).

$$R_G = \frac{GT_F}{GT_R} \qquad (1)$$

$$R_{TR} = \frac{D_T}{D_R} \qquad (2)$$

$$S_{RPM} = C_{RPM} * R_G * R_{TR} \qquad (3)$$

In one exemplary embodiment, the bicycle 40 and bicycle generator adapter 50 can have the following parameters, with a user cycling at a cadence ($C_{RPM}$) of 40 RPM resulting in a shaft speed ($S_{RPM}$) of 2,352 RPM:

$$R_G = \frac{GT_F}{GT_R} = \frac{42}{20} = 2.1 \qquad (4)$$

-continued $$R_{TR} = \frac{D_T}{D_R} = \frac{28}{1} = 28 \quad (5)$$

$$S_{RPM} = C_{RPM} * R_G * R_{TR} = 40 * 2.1 * 28 = 2,352 \quad (6)$$

As can be seen from these equations, varying one or more of these parameters can increase or decrease the resulting shaft speed ($S_{RPM}$), which will determine the amount of electrical power generated. For example, increasing the cadence ($C_{RPM}$), gear ratio ($R_G$), or rear tire/roller ratio ($R_{TR}$) will increase the shaft speed ($S_{RPM}$), which will increase the amount of electrical power generated (e.g., in the range of 30 W to 100 W). Various combinations of these parameters from different bicycles can produce shaft speeds ($S_{RPM}$) such as 3,000 RPM or more, with a desired power output such as 100 W or more. Accomplishing such high shaft speeds ($S_{RPM}$) and power output without the use of a gear box improves the reliability of the bicycle generator 52 and reduces the cost.

In one embodiment, the roller 54 can be a 1" (25.4 mm) diameter extruded aluminum tube with no additional surface treatment. Rollers 54 of other materials (e.g., polypropylene) and dimensions can also be used. A roller 54 with a larger diameter (e.g., 1.25" (31.75 mm)) will reduce the rear tire/roller ratio ($R_{TR}$) and require a higher cadence ($C_{RPM}$) to provide the same amount of power as a smaller diameter, while a roller 54 with a smaller diameter (e.g., 0.75" (19.05 mm)) will increase the rear tire/roller ratio ($R_{TR}$) and only require a lower cadence ($C_{RPM}$) to provide the same amount of power as a larger diameter. Use of a smaller diameter roller 54, however, can increase the slip (SL) that occurs between the rear tire 46 and roller 54 during cycling, leading to inefficiencies (i.e., cycling effort not resulting in rotation of the roller 54 and shaft 53). The smaller diameter roller 54 can also result in more voltage spikes of higher amplitude which can cause damage to the electronics of the power center 10. Use of a low-friction polypropylene roller 54 can also increase the slip (SL) as compared with the use of extruded aluminum. It is desirable to keep slip to a minimum as the greater the amount of slip (SL), the slower the shaft speed ($S_{RPM}$) as shown in the following equation, modifying equation (3) to account for slip (SL) (shown as a percentage, where no slip under ideal conditions would be SL=0.00 and ten percent slip would be SL=0.10)

$$S_{RPM} = C_{RPM} * R_G * R_{TR} * (1-SL) \quad (7)$$

In order to maintain slip below acceptable levels (e.g., below 10%), the tensioning mechanism 58 with hooks 59 on each end can be adjusted (e.g., with straps) to provide varying amounts of pressure from the roller 54 onto the rear tire 46 (e.g., 4.5 kg, 6.0 kg, 8.5 kg, etc.). The use of higher pressure, however, can increase the amount of energy needed by the user to provide the necessary cadence ($C_{RPM}$) and increase the amount of wear on the rear tire 46. Similarly, including texture on the roller 46 to increase the friction between the roller 54 and the rear tire 46 reduces slip but also increases the amount of wear on the rear tire 46.

Figure 5:
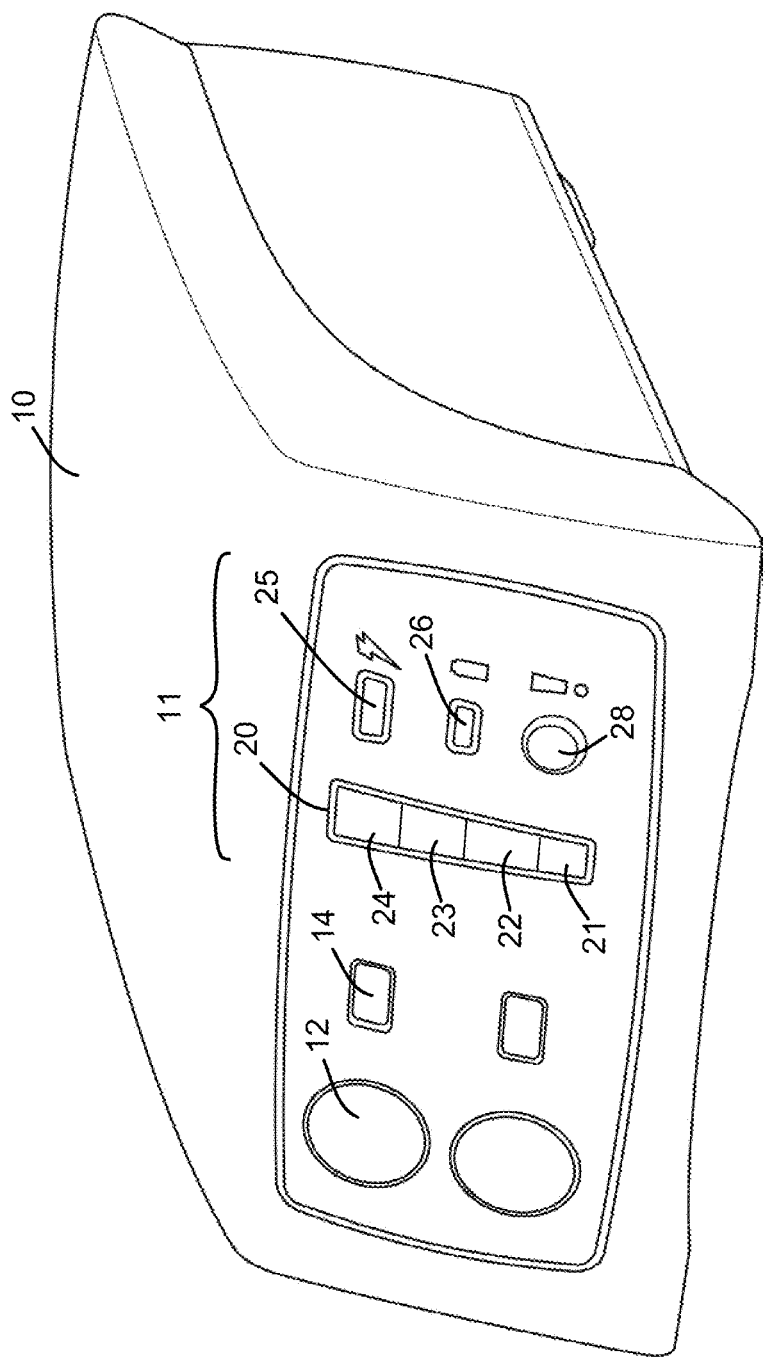
FIG. 5 illustrates a user interface of a power center in an exemplary embodiment of the invention.

FIG. 5 illustrates a user interface 11 of a power center 10 in an exemplary embodiment of the invention. The user interface 11 can include a plurality of elements designed to convey information about the power center 10 to the user (e.g., state of charge of the power center 10, whether the battery of the power center 10 is charging or discharging, the rate of charging or discharging of the battery, whether maintenance is required, and whether an error or fault has occurred).

As shown in FIG. 5, the state/rate of charge indicator 20 can be a funnel or inverted cone shaped display of a plurality of LEDs or other visual indicators. LEDs can be used based on their reliability and long life as well as their low power consumption. The brightness and related current draw of the each of the LEDs can be controlled by selecting an appropriately series resister (e.g., 330 ohms). In one embodiment, the state/rate of charge indicator 20 can include a red first (low) state/rate LED 21, an amber second state/rate LED 22, an amber third state/rate LED 23, and an amber fourth state/rate LED 24 to provide the required information. For example, if the red first (low) state/rate LED 21 were continuously illuminated, that would communicate to a user that the battery of the power center 10 has 25% or less of full capacity charge remaining, while if all four LEDs 21, 22, 23, 24 were continuously illuminated, including the amber fourth state/rate LED 24, that would communicate to the user that the power center 10 has more than 75% of full capacity charge remaining.

When the power center 10 is charging/discharging, as indicated by the amber charge/discharge LED 25 (e.g., illuminated only when the battery is charging and turned off when the battery is not charging), the particular percentage range of remaining battery charge at that moment (e.g., 50% to 75%) can be communicated by flashing the corresponding charge/discharge LED (e.g., amber third state/rate LED 23) during charging/discharging. In addition, the rate of flashing of the corresponding charge/discharge LED can be determined by the rate of charging/discharging of the battery (e.g., the faster the rate of charging/discharging, the higher the frequency of flashing of the LED). In an alternative embodiment, the charge/discharge LEDs 21, 22, 23, 24 can be illuminated in a cascading or rippling fashion to indicate charging or discharging of the battery of the power center 10.

The need for maintenance of the power center 10 can be communicated to the user by the red maintenance LED 26, which can be illuminated to, e.g., indicate to the user that a full charge of the battery is required to optimize battery performance and life. In the event of a fault or other error, all of the LEDs can flash for a predetermined amount of time to alert the user of the existence of the error or fault, and that the outputs 12, 14 have been disconnected. In the event of a fault or other error, the multi-function pushbutton 28 can be pressed to reset the power center 10 to reactivate the outputs 12, 14 or to accept an energy source. In addition, the multi-function pushbutton 28 can be pressed during normal conditions to display the state of charge on the state/rate of charge indicator 20. If the power center 10 is off, the multi-function pushbutton 28 can be pressed to energize the power center 10.

In addition to the information about the power center 10 conveyed to the user by the user interface 11, the power center 10 can also include an audible device to provide information and feedback. For example, a buzzer can be used that can play several different notes based on the switching frequency to provide audible notification when a particular event occurs (e.g., a positive sound to indicate the beginning of charging/discharging, a positive sound to indicate the completion of 1 watt-hour of charging, a negative sound if voltage is approaching dangerous levels, a beeping negative sound to indicate the presence of a fault, a continuous negative sound to indicate the use of an improper input device).

The power center 10 can also include a plastic enclosure with a dimple (not shown) on the underside of the unit at its center of gravity, shaped appropriately to rest on the top of a user's head during transport.

Figure 6:
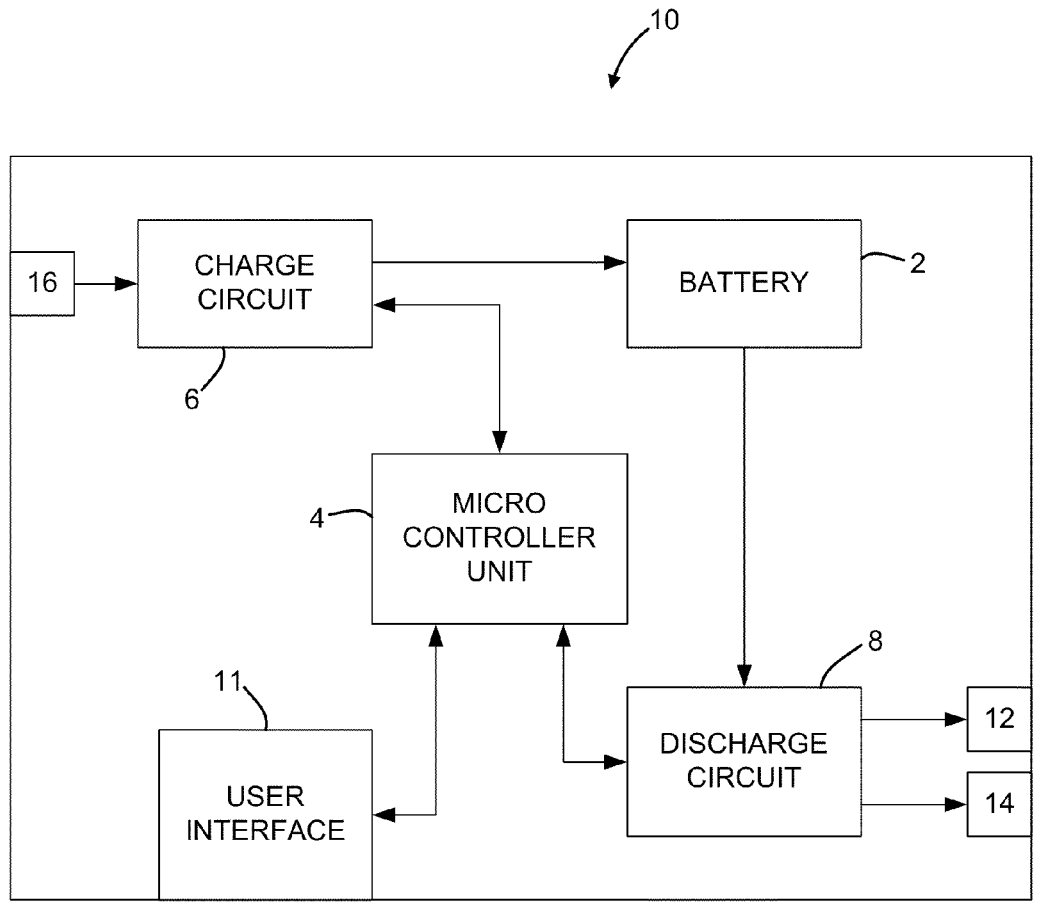
FIG. 6 is a block diagram of a power center in an exemplary embodiment of the invention.

FIG. 6 is a block diagram of a power center 10 in one exemplary embodiment of the invention. The power center 10 includes a battery 2, which can be a sealed, maintenance free 12V DC lead-acid battery. The power center 10 can include a microcontroller unit (MCU) 4 powered by the battery 2 (e.g., at 5V DC or 3.3V DC) that communicates relevant information about the power center 10 to the user through the user interface 11 discussed previously. For example, the MCU 4 can be directly connected to power the LEDs 21, 22, 23, 24, 25, 26 of the user interface 11 through a resistor without the need for driver circuitry.

The MCU 4 can also control the operation and interaction of the other components of the power center 10 to manage power measurements, and control the inputs and outputs to the power center 10 to optimize battery performance and life. The MCU 4 dynamically controls the charge circuit 6, which is responsible for receiving power from a plurality of different types of energy sources attached to the input terminals 16 and using that power to charge the battery 2 in a safe and efficient way. The MCU 4 also dynamically controls the discharge circuit 8, which supplies power to and monitors the outputs 12, 14 to prevent the user from drawing power out of the battery 2 in a manner that might damage the battery 2.

Figure 7:
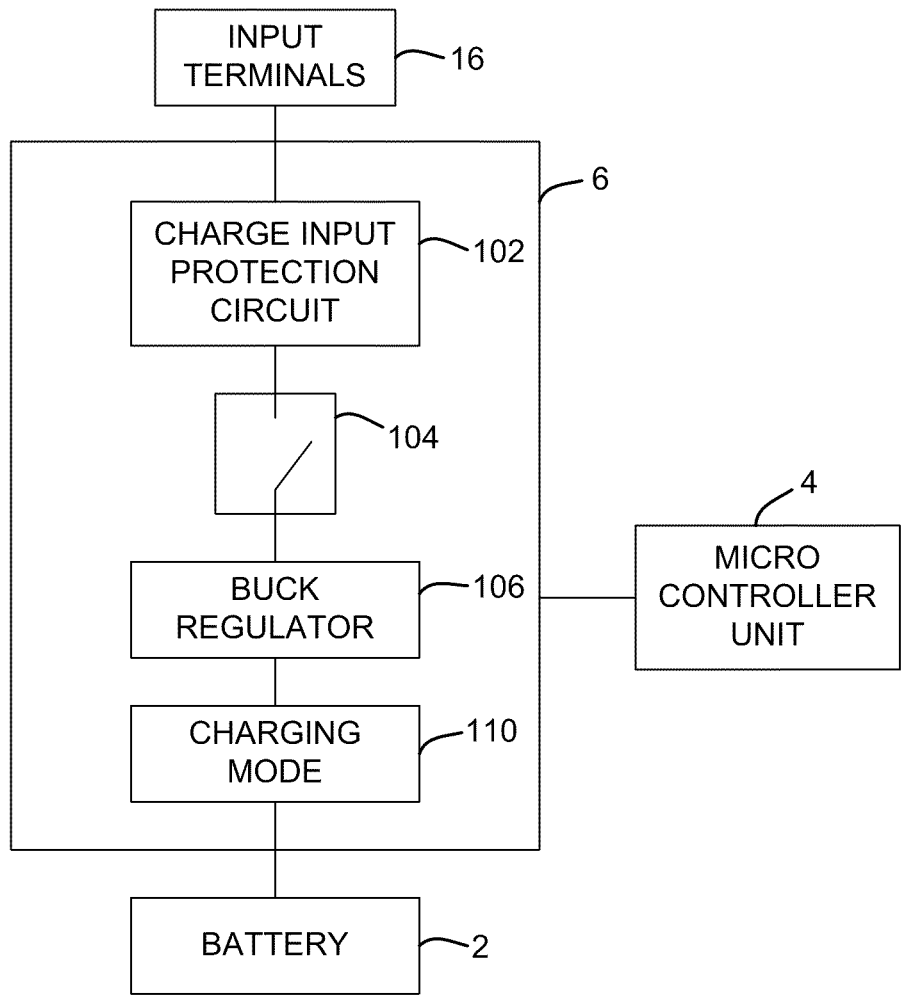
FIG. 7 is a block diagram of a charge circuit in an exemplary embodiment of the invention.

FIG. 7 is a block diagram of a charge circuit 6 in an exemplary embodiment of the invention. The charge circuit 6 can include a charge input protection circuit 102 for protecting the power center 10 from being damaged by certain harmful or inappropriate energy sources connected to the input terminals 16. A charge input switch 104 (provided hardware (mechanical (e.g., relay) or electrical (e.g., MOSFET)) or software) located after the charge input protection circuit 102 can isolate the energy sources from the power center 10 by serving as a gatekeeper to allow current (closed state) or block current (open state) from the sources from flowing into the remainder of power center 10 depending on whether those sources have been approved by the MCU 4. A conventional buck regulator 106 can be used to step down source voltages for correct charging of the battery 2 and to modulate any excess power when the battery 2 charge is near full. The MCU 4 can use current and voltage sensor readings to identify the particular energy source attached to the input terminals 16. Once the particular energy source has been identified, a charging mode 110 tailored to the particular energy source connected can be used to charge the battery 2. In one embodiment, the charge circuit 6 can accommodate charging voltages from 16V DC (minimum) to 30V DC (maximum) and charge the battery 2 at up to 4 A or 50 W depending on the available input power from the energy source. Other embodiments could include different ranges for charging voltages, currents, and wattages.

Turning first to the protection offered by the charge circuit 6, in one embodiment, the power center 10 should be able to withstand energy source voltages of up to 300V, alternating current (AC) sources, and inadvertent connections to the input terminals 16 with reverse polarity without damaging the power center 10. In order to accomplish this protection, the charge input protection circuit 102 can include a conventional full bridge rectifier on the input terminals 16 that allows the MCU 4 to read input voltage safely in the case of an AC energy source. The charge input protection circuit 102 can also include a conventional rectifier diode, rated up to 300V, so that if energy source is inadvertently connected with reverse polarity to the input terminals 16, no voltage will be sensed by the MCU 4. The rectifier diode can be used in addition to the full bridge rectifier since the full bridge rectifier would make a energy source connected with reverse polarity to the input terminals 16 appear positive. The charge input protection circuit 102 can also include a voltage divider to scale down voltages of up to 300V. If the energy source connected to the input terminals 16 is determined to be safe, the current from the energy source will bypass the full bridge rectifier and rectifier diode so as not to incur any substantial power losses across those components. Protected by the full bridge rectifier, rectifier diode, and/or voltage divider, the MCU 4 can safely detect overvoltage and AC inputs of up to 300V.

Figure 8:
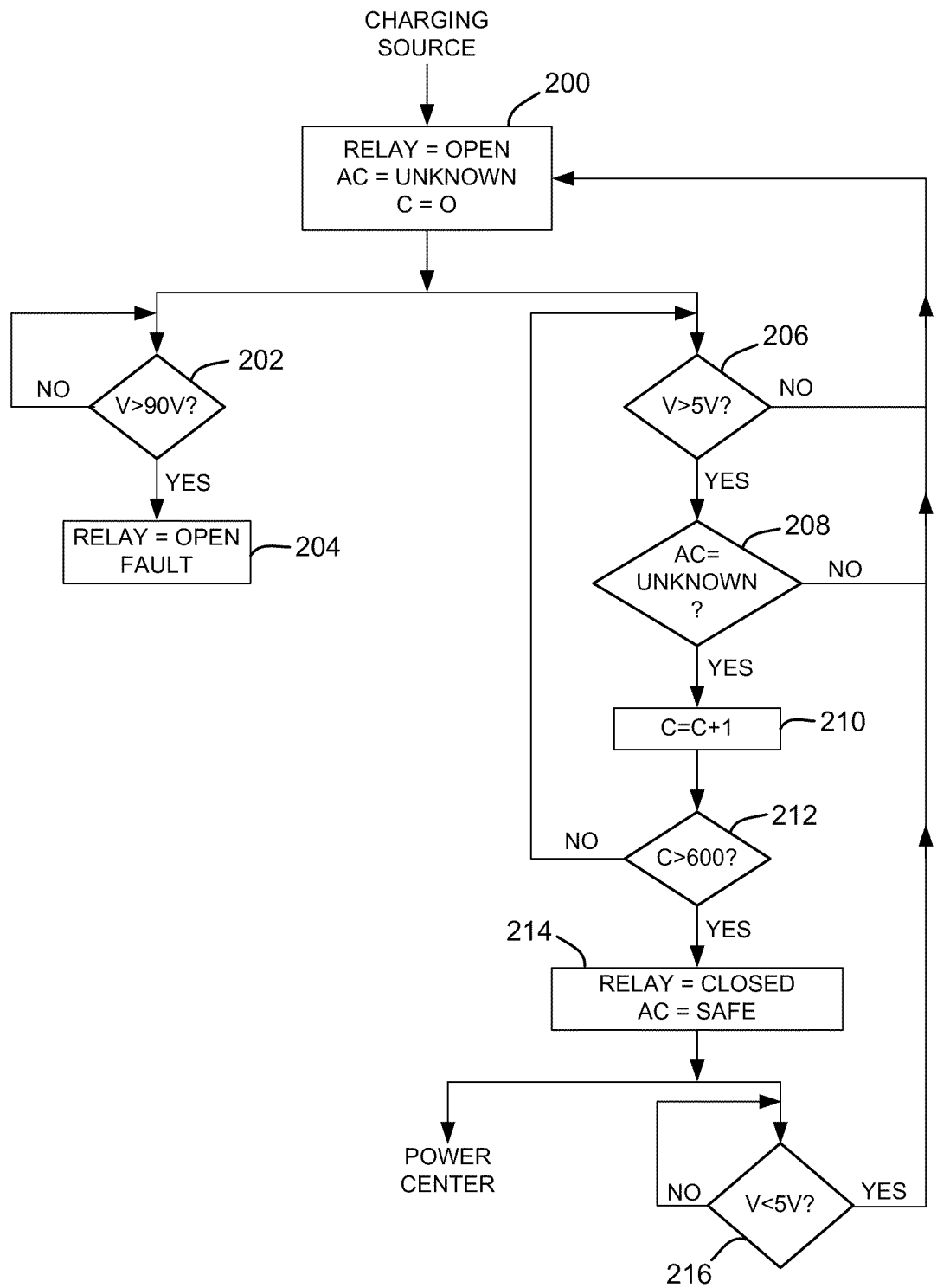
FIG. 8 is a flow diagram for charge input protection in one exemplary embodiment of the invention.

FIG. 8 is a flow diagram for charge input protection performed by the MCU 4 with the charge circuit 6 in one exemplary embodiment of the invention. When the energy source is connected to the input terminals 16, the current from the energy source first passes through the full bridge rectifier, rectifier diode, and/or voltage divider of the charge input protection circuit 102 as discussed previously, protecting the MCU 4. The initial or reset state of the MCU 4 at step 200 of the charge input protection has an AC flag set to "UNKNOWN" since it is has not been determined whether there is an inappropriate AC source, an AC counter (C) in the MCU set to 0 (C=0), and the charge input switch 104 in an open state (i.e., the current from the charge source cannot flow into the remainder of the power center 10).

In one embodiment of the invention, the voltage of the energy source is checked periodically (e.g., every 1 ms or some other interval) at the overvoltage check step 202 to determine if the voltage is greater than a maximum source voltage threshold (e.g., 90V). If the voltage is greater than the maximum source voltage threshold, the power center 10 goes into to a fault condition and opens the charge input switch 104 at step 204. If the voltage is not greater than the maximum source voltage threshold, the voltage of the energy source will continue to be checked periodically in a continuous loop.

In addition to checking for overvoltage, the voltage of the energy source is checked to make sure that it is not providing an AC signal that would damage the power center 10. The voltage is checked at step 206 to determine if the voltage of the energy source is greater than a minimum source voltage threshold (e.g., 5V) but still less than the maximum source voltage threshold. If the voltage of the energy source is not greater than the minimum source voltage threshold, the system returns to the initial or reset state step 200, and the AC counter (e.g., a timer) timer (C) is reset to zero. Using this test, if the voltage of the energy source is an AC signal with a frequency of 60 Hz (i.e., a period of 16.6 ms), the voltage will go through a complete cycle and, therefore, drop below the minimum voltage threshold every 16.6 ms, resetting the AC counter (C) to zero at step 200. If the voltage of the energy source is greater than the minimum source voltage threshold, the status of the AC flag is checked at step 208 to see if it is "UNKNOWN." If the status of the AC flag is not "UNKNOWN," the system returns to the initial or reset state step 200, and the AC counter (C) is reset to zero. If the status of the AC flag is "UNKNOWN," the AC counter (C) is incremented (e.g., by 1 ms or some other time interval) at step 210. Next, the AC counter (C) is checked to see if it is greater than an AC counting threshold (e.g., 600 ms) at step 212. If the AC counter (C) is not greater than the AC counting threshold, the system loops back and repeats the tests performed at steps 206 and 208 to check again for minimum voltage and the status of the AC flag. If the AC counter (C) is greater than the AC counting threshold, the AC flag is set to "SAFE" and the charge input switch 104 is closed (allowing current to flow from the charge source into the remainder of power center 10) at step 214 based on the fact that the voltage of the energy source cannot be an AC voltage since it would have reset the AC counter (C=0) with a voltage below the minimum voltage threshold before the counting threshold was reached (i.e., the AC counter (C) would have reset after 16.6 ms for a 60 Hz AC signal).

As shown in FIG. 7, after passing through the charge input protection circuit 102 and charge input switch 104, the signal from the energy source is received by the conventional buck regulator 106, which converts the voltage of the energy source down to a lower voltage (e.g., 12V) for charging of the battery 2. In one embodiment, the buck regulator 106 can use a transistor (e.g., a MOSFET) as a switch to alternatively connect (switch closed) and disconnect (switch open) the energy source, (e.g., at a frequency of 25 kHz). By varying the duty cycle (i.e., time that the switch is closed and the charge source is connected) of the buck regulator 106 using pulse width modulation (PWM), the MCU 4 can control charging of the battery 2.

Figure 9:
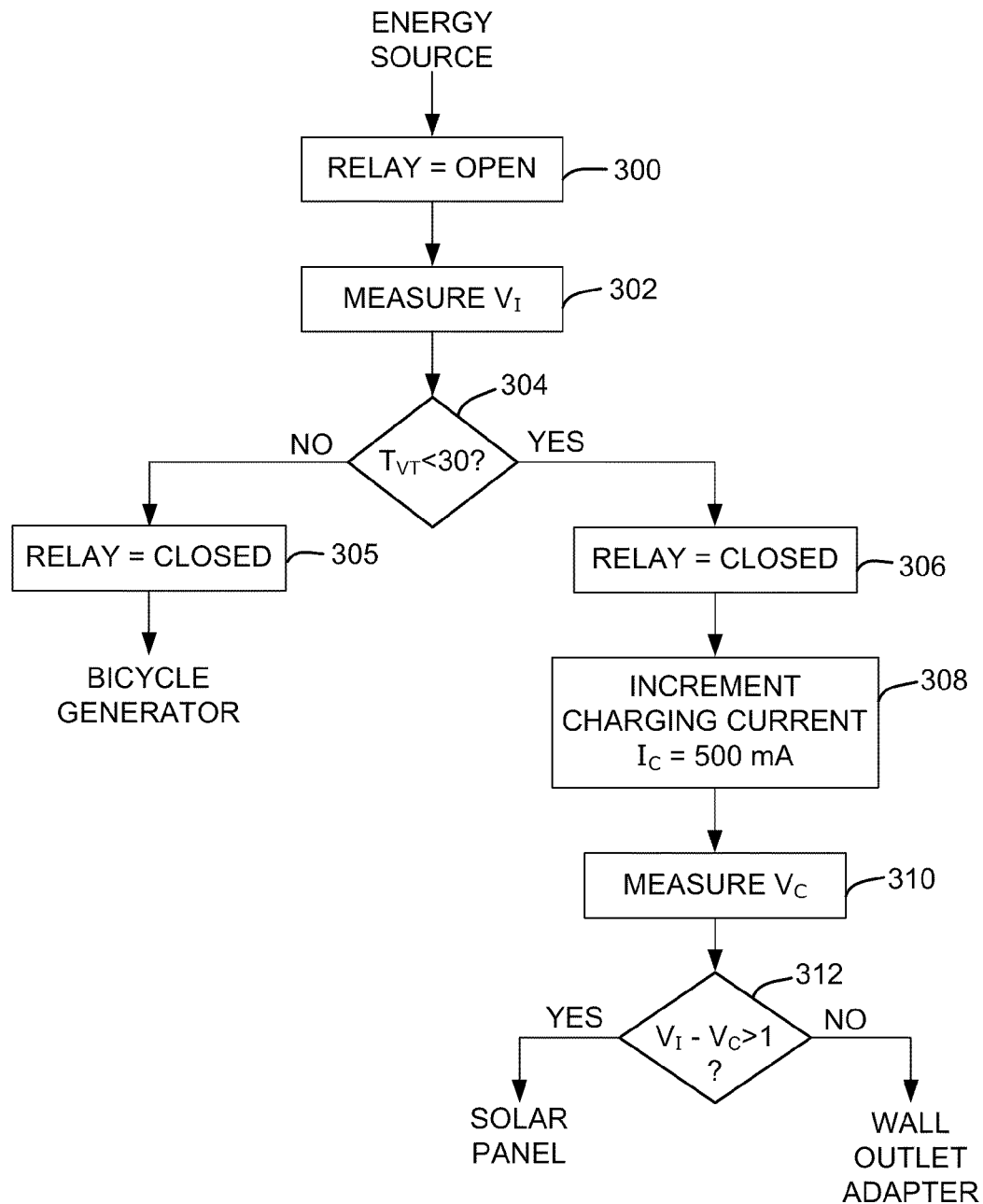
FIG. 9 is a flow diagram for energy source identification in one exemplary embodiment of the invention.

FIG. 9 is a flow diagram for energy source identification performed by the MCU 4 with the charge circuit 6 in one exemplary embodiment of the invention. As discussed previously and as shown in FIG. 1, the electrical power system 1 can include a plurality of different types of energy sources (e.g., a solar panel 30, wall outlet adapter 33, windmill 34, bicycle generator 52). In one embodiment of the invention, the power center 10 can identify the particular energy source connected to the input terminals 16. At step 300, the charge input switch 104 is open when the energy source is connected to the input terminals 16. At step 302, the initial source voltage ($V_I$) at the input terminals 16 is measured by the MCU 4. At step 304, the MCU 4 measures the voltage transition time ($T_{VT}$) that it takes to transition from a point where there is substantially no voltage on the input terminals 16 (e.g., just prior to connection of the energy source) to a point where the voltage of the energy source is substantially constant and/or at or above the minimum charging voltage (e.g., 16V DC). If the voltage transition time ($T_{VT}$) is greater than a voltage transition time threshold (e.g., 30 ms), indicating that the constant charging voltage was arrived at relatively slowly, the energy source is most likely a source that provides substantially varying voltage output (e.g., bicycle generator 52, wind turbine 34, hydro turbine, hand-crank, animal generator, etc.). Accordingly, at step 305 and after it has been determined that the energy source is safe, the charge input switch 104 can be closed and charging for a bicycle generator 52 (or wind turbine 34, hydro turbine, etc.) can begin.

If the voltage transition time ($T_{VT}$) is less than a voltage transition time threshold (e.g., 30 ms), indicating that the constant charging voltage was arrived at almost instantaneously, the energy source is most likely a source that provides substantially constant voltage outputs (e.g., a solar panel 30, wall outlet adapter 33, etc.). Additional steps can be used in order to distinguish between the solar panel 30 and the wall outlet adapter 33. At step 306 and after it has been determined that the energy source is safe, the charge input switch 104 can be closed. At step 308, the MCU 4 can increment the charging current of the source ($I_C$) by increasing the duty cycle of the buck regulator until a charge current threshold (e.g., $I_C$=500 mA) is reached. At step 310, the energy source voltage ($V_C$) at the input terminals is measured by the MCU 4. At step 312, the MCU 4 determines if the difference between the energy source voltage ($V_C$) and the initial source voltage ($V_I$) is greater than a voltage sag threshold (e.g., 1V DC). If the voltage had decreased or sagged less than the voltage sag threshold, then the energy source is most likely a source that provides a substantially constant voltage output under both load and no load conditions (e.g., a wall outlet adapter 33). If the voltage has sagged more than the voltage sag threshold, then the energy source is most likely a source that experiences substantial voltage sag under load conditions (e.g, a solar panel 30). As shown in FIG. 6, after the energy source has been identified, the power center 10 can enter the appropriate charging mode 110 for that particular energy source. In other embodiments of the invention, different techniques can be used to identify the energy source, including monitoring manual switches, communication over power, a digital handshake, or the use of special tip that plugs into the power center 10 to indicate the particular source employed.

Figure 10:
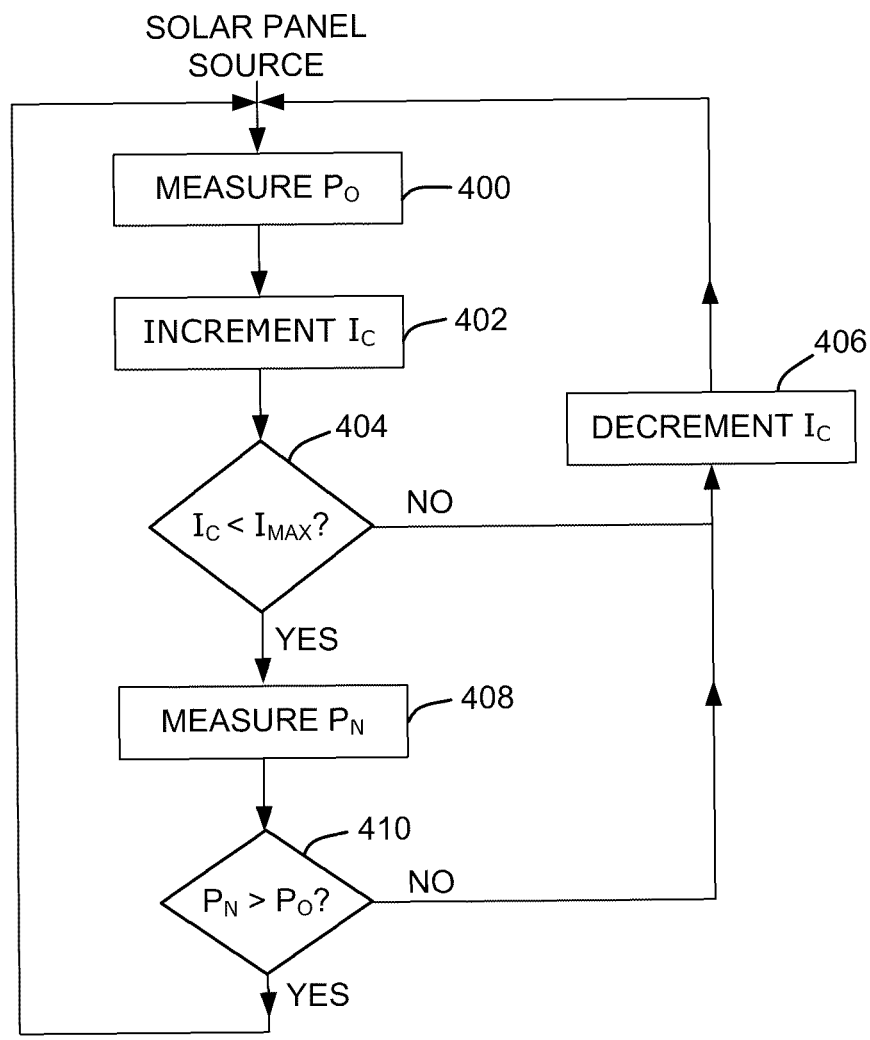
FIG. 10 is a flow diagram for the charging mode of a solar panel in one exemplary embodiment of the invention.

FIG. 10 is a flow diagram for the charging mode 110 of the solar panel 30 in one exemplary embodiment of the invention. If the energy source is a solar panel 30, the MCU 4 can dynamically track the maximum power point of the solar panel 30, which depends upon voltage and current and changes as the solar panel 30 receives different levels of sunlight. In order to track the maximum power point, the MCU 4 continually monitors the effects of incrementing or decrementing the charging current ($I_C$) of the solar panel 30 to see if there is a more optimal charging point. In one embodiment, the MCU 4 can measure the original power output of the solar panel 30 ($P_O$) (e.g., the charging current ($I_C$) of the solar panel 30 multiplied by the output voltage of the solar panel 30) at step 400. Next, the MCU 4 can increment the charging current ($I_C$) of the solar panel 30 by a step (e.g., 0.05 A) by increasing the duty cycle of the buck regulator at step 402. After incrementing the charging current ($I_C$), the MCU 4 can check if the charging current ($I_C$) is less than the maximum ($I_{MAX}$) allowable charging current (e.g., 4 A) at step 404. If the charging current ($I_C$) of the solar panel 30 is not less than the maximum allowable charging current ($I_{MAX}$), the MCU 4 can decrement the charging current ($I_C$) of the solar panel 30 by a step at step 406 and repeat the process. If the charging current ($I_C$) of the solar panel 30 is less than the maximum allowable charging current ($I_{MAX}$), the MCU 4 can then measure the new power output ($P_N$) of the solar panel 30 at step 408 based on the new charging current of the solar panel 30 to determine if the new power output ($P_N$) is greater than the original power output ($P_O$) at step 410 (i.e., to determine if incrementing the charging current improved the power output of the solar panel 30). If the new power output ($P_N$) of the solar panel 30 is greater than the original power output ($P_O$), the MCU 4 can repeat the process starting at step 400. If the new power output ($P_N$) of the solar panel 30 is not greater than the original power output ($P_O$), the MCU 4 can decrement the charging current ($I_C$) of the solar panel 30 by a step at step 406 and repeat the process. The rate of incrementing or decrementing the charging current ($I_C$) of the solar panel 30 can be done relatively slowly since a rapid change in the charging current ($I_C$) could result in an unstable input voltage of the solar panel 30 since the voltage is current dependent. For example, the rate of incrementing the charging current ($I_C$) of the solar panel 30 should be chosen to avoid the possibility of decreasing the input voltage of the solar panel 30 below the minimum charging voltage (e.g., 16V DC).

Figure 11:
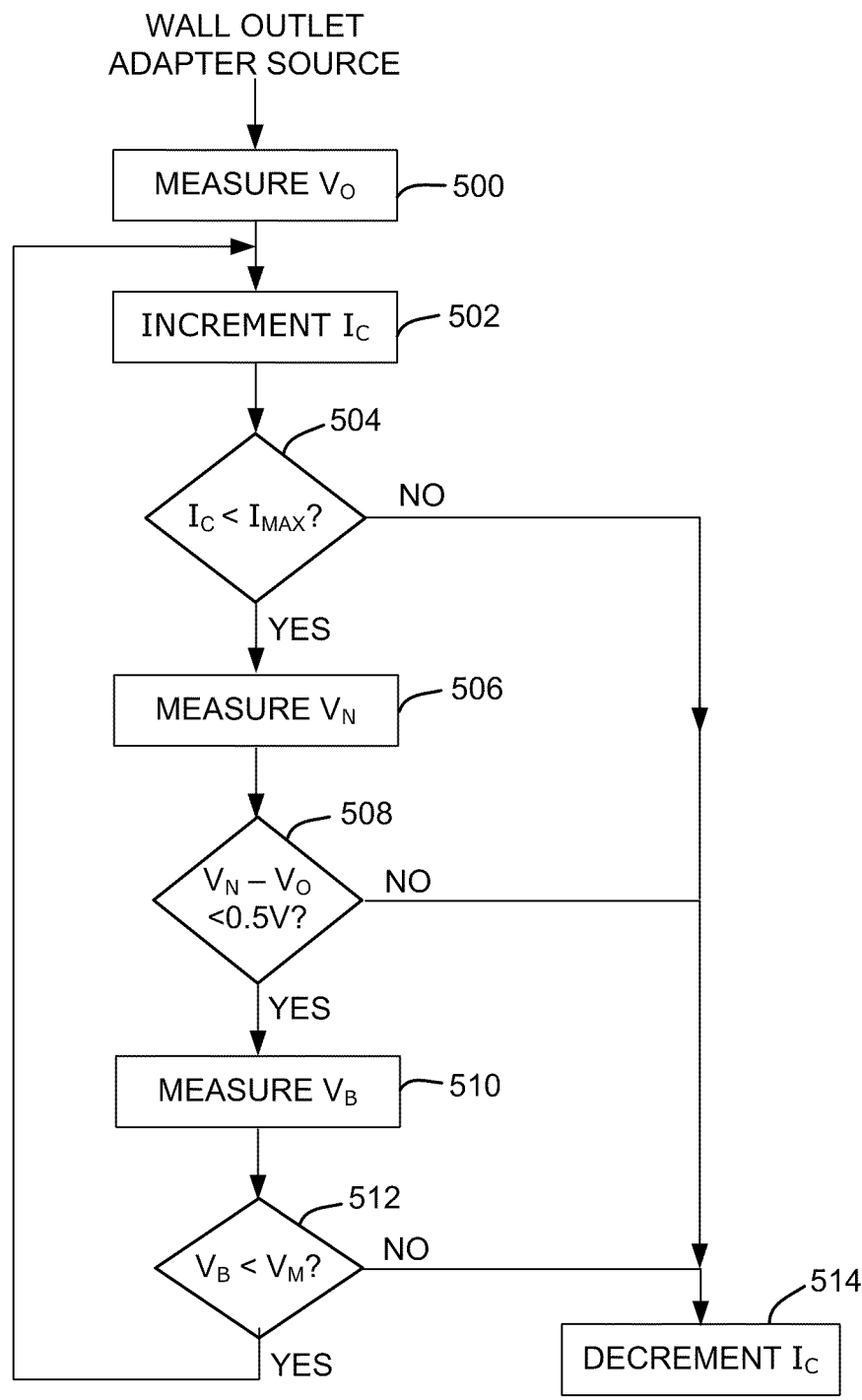
FIG. 11 is a flow diagram for the charging mode of a wall outlet adapter in one exemplary embodiment of the invention.

FIG. 11 is a flow diagram for the charging mode 110 of a wall outlet adapter 33 in one exemplary embodiment of the invention. If the energy source is a wall outlet adapter 33, the MCU 4 can dynamically determine the maximum current rating of the wall outlet adapter 33, which will provide a rated constant voltage up to a rated maximum current. Since the voltage provided by the wall outlet adapter 33 will remain constant until the maximum current rating is exceeded, at which point the voltage will decrease (or sag), by incrementing the charging current ($I_C$) of the wall outlet adapter 33 and monitoring the voltage of the wall outlet adapter 33, the MCU 4 can determine when the maximum current of the wall outlet adapter 33 is reached. In one embodiment, the MCU 4 can measure the original voltage ($V_O$) of the wall outlet adapter 33 at step 500. Next, the MCU 4 can increment the charging current ($I_C$) of the wall outlet adapter 33 by a step (e.g., 0.1 A) at step 502 by increasing the duty cycle of the buck regulator 106. After incrementing the charging current ($I_C$), the MCU 4 can check if the charging current is less than the maximum allowable charging current ($I_{MAX}$) (e.g., 4 A) at step 504. If the charging current ($I_C$) of the wall outlet adapter 33 is not less than the maximum allowable charging current ($I_{MAX}$), the MCU 4 can decrement the charging current ($I_C$) of the wall outlet adapter 33 by a step at step 514 and charge at this current level. If the charging current ($I_C$) of the wall outlet adapter 33 is equal to the maximum allowable charging current ($I_{MAX}$) (not shown), the MCU 4 charge at this current level. If the charging current ($I_C$) of the wall outlet adapter 33 is less than the maximum allowable charging current ($I_{MAX}$), the MCU 4 can then measure the new voltage ($V_N$) of the wall outlet adapter 33 at step 506 to determine if the new voltage ($V_N$) has decreased (or sagged) less than a voltage sag threshold (e.g., 0.5V DC) as compared with the original voltage ($V_O$) at step 508. If the voltage sag is not less than the voltage sag threshold, the MCU 4 can decrement the charging current ($I_C$) of the wall outlet adapter 33 by a step at step 514 and charge at this current level. If the voltage sag is less than the voltage sag threshold, the MCU 4 can next determine the internal battery voltage ($V_B$) of the power center 10 as step 510, and then determine if the internal battery voltage ($V_B$) is less than the maximum safe internal battery voltage ($V_M$) at step 512. If the internal battery voltage ($V_B$) is not less than the maximum safe internal battery voltage ($V_M$), the MCU 4 can decrement the charging current ($I_C$) of the wall outlet adapter 33 by a step at step 514 and charge at this current level. If the internal battery voltage ($V_B$) is less than the maximum safe internal battery voltage ($V_M$), the MCU 4 charge at this current level, increment the charging current ($I_C$) of the wall outlet adapter 33 by a step at 502, and repeat the process. The rate of incrementing or decrementing the charging current ($I_C$) of the wall outlet adapter 33 can be done relatively quickly as compared to the solar panel 30.

Figure 12:
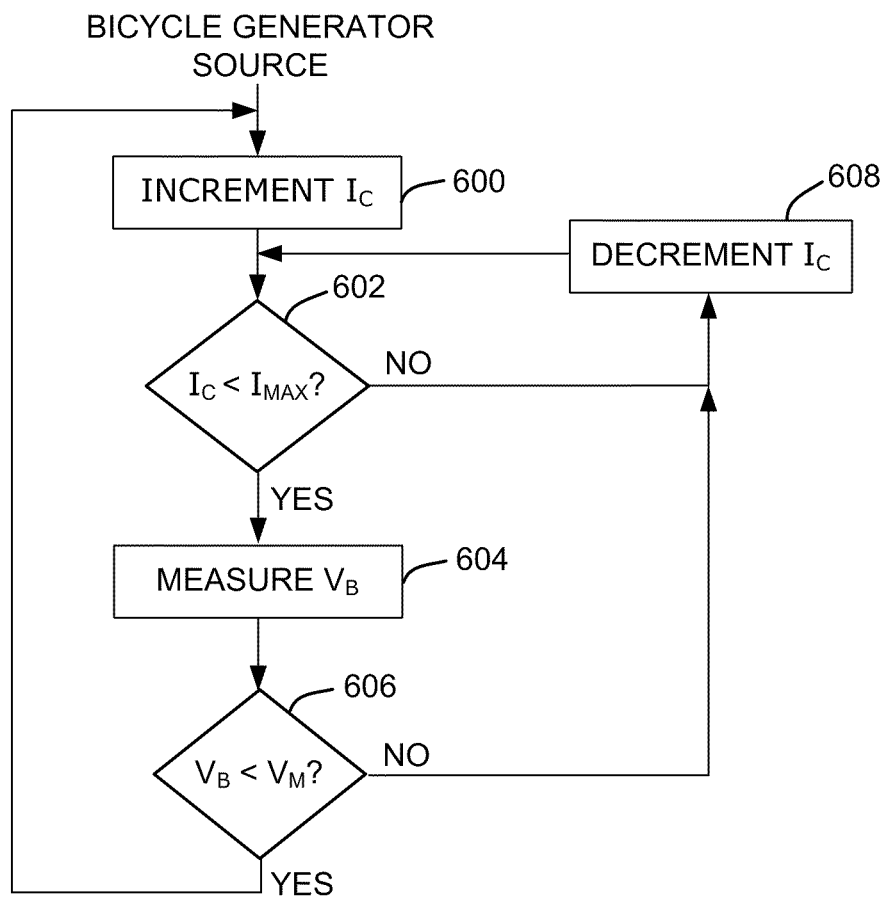
FIG. 12 is a flow diagram for the charging mode of a bicycle generator in one exemplary embodiment of the invention.

FIG. 12 is a flow diagram for the charging mode 110 of a bicycle generator 52 in one exemplary embodiment of the invention. If the energy source is a bicycle generator 52, the MCU 4 can dynamically determine the internal battery voltage ($V_B$) to make sure that it is less than the maximum safe internal battery voltage ($V_M$), which changes based on the state of charge of the battery 2. In one embodiment, the MCU 4 can increment the charging current ($I_C$) of the bicycle generator 52 by a step (e.g., 0.1 A) at step 600 by increasing the duty cycle of the buck regulator 106. After incrementing the charging current (0, the MCU 4 can check if the charging current is less than the maximum allowable charging current ($I_{MAX}$) (e.g., 4 A) at step 504. If the charging current ($I_C$) of the bicycle generator 52 is not less than the maximum allowable charging current ($I_{MAX}$), the MCU 4 can decrement the charging current ($I_C$) of the bicycle generator 52 by a step at step 608 and repeat the test at step 602. If the charging current ($I_C$) of the bicycle generator 52 is less than the maximum allowable charging current ($I_{MAX}$), the MCU 4 can next determine the internal battery voltage ($V_B$) of the power center 10 as step 604, and then determine if the internal battery voltage ($V_B$) is less than the maximum safe internal battery voltage ($V_M$) at step 606. If the internal battery voltage ($V_B$) is not less than the maximum safe internal battery voltage ($V_M$), the MCU 4 can decrement the charging current ($I_C$) of the bicycle generator 52 by a step at step 608 and repeat the test at step 602. If the internal battery voltage ($V_B$) is less than the maximum safe internal battery voltage ($V_M$), the MCU 4 can increment the charging current ($I_C$) of the bicycle generator 52 by a step at 600 and repeat the process.

In one exemplary embodiment of the invention, a thermistor is used to measure ambient temperature. If the temperature falls outside of a safe operating range for the battery (e.g., −20° C. to 60° C.), the inputs and outputs are disabled, and an error message is displayed. Otherwise, if the ambient temperature is above 25° C., the maximum battery voltage for charging is reduced (e.g., by 24 mV/° C.) to protect the battery from damage due to overcharging, because the battery capacity is elevated at temperatures above 25° C.

As discussed previously and shown in FIG. 5, the need for maintenance of the power center 10 can be communicated to the user by the red maintenance LED 26, which can be illuminated to indicate to the user that a full charge of the battery 2 is required to optimize battery performance and life. Repeated charging of the battery 2 without fully charging the battery 2 can significantly reduce the life of the battery 2. In one embodiment of the invention, a counter or timer can be used to track the number of charges between full charges and/or the time between full charges and compare those numbers to thresholds based on proper maintenance of the battery 2. For example, if it is advisable to complete a full charge after every seven incomplete charges, a counter can be used to count each of the incomplete charges. When that counter reaches seven, red maintenance LED 26 can be illuminated and reset when the MCU 4 determines that the battery 2 has been fully charged. Similarly, if it is advisable to complete a full charge after every seven days, a timer can be used to track the time. When the timer reaches seven days, red maintenance LED 26 can be illuminated and reset when the MCU 4 determines that the battery 2 has been fully charged. The MCU 4 can also measure cumulative power throughput and, after a certain threshold has been reached (e.g., 200 watt-hours), illuminate red maintenance LED 26.

Returning to FIG. 6, the MCU 4 controls the discharge circuit 8, which regulates power to and monitors the outputs 12, 14 to prevent the user from drawing power out of the battery 2 in a manner that might damage the battery 2. The MCU 4 monitors the output currents and disables the outputs 12, 14 if the user attempts to draw too much power or if a short circuit occurs. In one embodiment, the 12V DC cigarette lighter outputs 12 are powered directly from the battery 2, and the 5V DC USB outputs 14 are powered from the battery 2 through a 5V switching regulator. The outputs 12, 14 can be equipped with current sensors to measure the current draw.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for identifying different types of energy sources used to charge a battery, the method comprising the steps of:

receiving energy from an energy source of at least one of the different types of energy sources at input terminals;

determining a voltage of the energy source at the input terminals;

identifying a type of the energy source; and selecting a mode for charging the battery based on the type of the energy source identified;

wherein said identifying the type of the energy source comprises:

determining a transition time for transitioning from substantially zero voltage at the input terminals to when the voltage at the input terminals is substantially constant and/or at or above a voltage threshold; and comparing the transition time to a transition time threshold.

2. The method of claim 1, further comprising:
determining that the transition time is less than the transition time threshold;
incrementing a charging current of the energy source until a first current threshold is reached;
determining a voltage of the energy source at the input terminals after the first current threshold has been reached; and
identifying the type of energy source by comparing a voltage sag threshold to a voltage difference between the voltage of the energy source at the input terminals after the first current threshold has been reached and the voltage of the energy source at the input terminals before said incrementing the charging current.

3. The method of claim 2, wherein said identifying the type of energy source further comprises determining that the voltage difference is greater than the voltage sag threshold.

4. The method of claim 3, wherein the energy source is a solar panel.

5. The method of claim 4, further comprising:
determining a power output of the solar panel;
incrementing the charging current of the solar panel by a first selected amount;
determining a power output of the solar panel after said incrementing the charging current by the first selected amount; and either:
a) incrementing the charging current of the solar panel by a second selected amount if the power output of the solar panel after said incrementing the charging current by the first selected amount is greater than the power output of the solar panel before said incrementing the charging current by the first selected amount; or
b) decrementing the charging current of the solar panel by a third selected amount if the power output of the solar panel after said incrementing the charging current by the first selected amount is less than the power output of the solar panel before said incrementing the charging current by the first selected amount.

6. The method of claim 2, wherein said identifying the type of energy source further comprises determining that the voltage difference is less than the voltage sag threshold.

7. The method of claim 6, wherein the energy source is a wall outlet adaptor.

8. The method of claim 7, further comprising:
determining a voltage of the wall outlet adapter at the input terminals;
a first incrementing step of incrementing the charging current of the wall outlet adapter by a first selected amount;
determining a voltage of the wall outlet adapter at the input terminals after the first incrementing step; and either:
a) incrementing the charging current of the wall outlet adapter by a second selected amount if a voltage difference between the voltage of the wall outlet adapter at the input terminals after the first incrementing step and the voltage of the wall outlet adapter at the input terminals before the first incrementing step is less than the voltage sag threshold; or
b) decrementing the charging current of the wall outlet adapter by a third selected amount if the voltage difference between the voltage of the wall outlet adapter at the input terminals after the first incrementing step and the voltage of the wall outlet adapter at the input terminals before the first incrementing step is greater than the voltage sag threshold.

9. The method of claim 8, further comprising:
determining a voltage of the battery after the first incrementing step; and either
a) incrementing the charging current of the wall outlet adapter by a fourth selected amount if the voltage of the battery after the first incrementing step is less than a maximum battery voltage; or
b) decrementing the charging current of the wall outlet adapter by a fifth selected amount if the voltage of the battery after the first incrementing step is greater than the maximum battery voltage.

10. The method of claim 1, wherein said identifying the type of energy source further comprises determining that the transition time is greater than the transition time threshold.

11. The method of claim 10, wherein the energy source is one of a bicycle generator, a wind turbine, a hydro turbine, a hand crank, or an animal generator.

12. The method of claim 11, wherein the energy source is the bicycle, generator, the method further comprising:
incrementing a charging current of the bicycle generator by a first selected amount;
determining a voltage of the battery after said incrementing the charging current by the first selected amount; and either
a) incrementing the charging current of the bicycle generator by a second selected amount if the voltage of the battery after said incrementing the charging current by the first selected amount is less than a maximum battery voltage; or
b) decrementing the charging current of the bicycle generator by a third selected amount if the voltage of the battery after said incrementing the charging current by the first selected amount is greater than the maximum battery voltage.

13. The method of claim 1, wherein the voltage threshold is a minimum voltage for charging the battery.

14. An apparatus for identifying different types of energy sources used to charge a battery, the apparatus comprising:
input terminals for receiving energy from an energy source of at least one of the different types of energy sources;
a voltage sensor for determining a voltage of the energy source at the input terminals; and
a microcontroller for:
determining a transition time for transitioning from substantially zero voltage at the input terminals to when the voltage at the input terminals is substantially constant and/or at or above a voltage threshold;
identifying the type of energy source by comparing the transition time to a transition time threshold; and
selecting a mode for charging the battery based on the type of energy source identified.

15. A method for identifying a type of an energy source used to charge a battery, the method comprising:
receiving energy from the energy source at input terminals;
determining a voltage of the energy source at the input terminals;
using the determined voltage, determining that the energy source is either of a type that provides substantially varying voltage output or of a type that provides substantially constant voltage output; said determining that the energy source is either of the type that provides substantially varying voltage output or of the type that provides substantially constant voltage output comprising:
    determining a transition time for transitioning from substantially zero voltage at the input terminals to when the voltage at the input terminals is substantially constant and/or at or above a voltage threshold; and
    comparing the transition time to a transition time threshold;
if the energy source is of the type that provides substantially constant voltage output, determining that the energy source is either of a type that provides substantially constant voltage output under both load and no load conditions or that the energy source is of a type that provides substantially constant voltage output and experiences voltage sag under load conditions using the determined voltage; and
selecting a mode for charging the battery based on the determined type of the energy source.

16. The method of claim 15, wherein said determining that the energy source is either of the type that provides substantially constant voltage output under both load and no load conditions or of the type that provides substantially constant voltage output and experiences voltage sag under load conditions comprises:
    incrementing a charging current of the energy source until a first current threshold is reached;
    determining a voltage of the energy source at the input terminals after the first current threshold has been reached; and
    identifying the type of energy source by comparing a voltage sag threshold to a voltage difference between the voltage of the energy source at the input terminals after the first current threshold has been reached and a voltage of the energy source at the input terminals before said incrementing the charging current.

17. The method of claim 16, further comprising determining that the voltage difference is greater than the voltage sag threshold, wherein the energy source is a solar panel.

18. The method of claim 16, further comprising determining that the voltage difference is less than the voltage sag threshold, wherein the energy source is a wall outlet adaptor.

19. The method of claim 15, wherein the voltage threshold is a minimum voltage for charging the battery.

* * * * *